(12) United States Patent
Wasilewski

(10) Patent No.: US 6,374,275 B2
(45) Date of Patent: *Apr. 16, 2002

(54) SYSTEM, METHOD, AND MEDIA FOR INTELLIGENT SELECTION OF SEARCHING TERMS IN A KEYBOARDLESS ENTRY ENVIRONMENT

(75) Inventor: Anthony John Wasilewski, Alpharetta, GA (US)

(73) Assignee: Scientific-Atlanta, Inc., Lawrenceville, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,050

(22) Filed: Jun. 11, 1997

(51) Int. Cl.[7] ................................. G06F 15/00
(52) U.S. Cl. .................. 707/530; 707/526; 707/532
(58) Field of Search .............................. 707/1–530, 531; 382/100; 709/200, 201, 203–219

(56) References Cited

U.S. PATENT DOCUMENTS

| | | | |
|---|---|---|---|
| 4,786,895 A | | 11/1988 | Castaneda |
| 5,187,797 A | | 2/1993 | Nielsen et al. |
| 5,222,234 A | | 6/1993 | Wang et al. .................... 707/3 |
| 5,275,980 A | * | 1/1994 | Pedersen et al. ................ 707/4 |
| 5,365,598 A | * | 11/1994 | Sklarew ........................ 382/13 |
| 5,410,359 A | | 4/1995 | Odijk et al. |
| 5,434,626 A | | 7/1995 | Hayashi et al. |
| 5,491,820 A | | 2/1996 | Belove et al. .................. 707/3 |
| 5,644,740 A | * | 7/1997 | Kiuchi ......................... 345/357 |
| 5,727,156 A | * | 3/1998 | Herr-Hoyman et al. ..... 709/217 |
| 5,873,076 A | * | 2/1999 | Barr et al. ...................... 707/3 |

\* cited by examiner

Primary Examiner—Hosain T. Alam
Assistant Examiner—Alford W. Kindred
(74) Attorney, Agent, or Firm—Kelly A. Gardner; Kenneth M. Massaroni; Hubert J. Barnhardt III

(57) ABSTRACT

The disclosed invention relates to a pick list generator which displays selectable terms for inclusion in a selection field. One embodiment of the pick list generator is in assisting an Internet user in the user's population of search fields without the use of a keyboard containing all 26 letters and 10 digits. Accordingly, through application of the present invention, browsing and searching of the Internet is enhanced for the keyboardless user.

32 Claims, 5 Drawing Sheets

SYSTEM, METHOD, AND MEDIA FOR INTELLIGENT SELECTION OF SEARCHING TERMS IN A KEYBOARDLESS ENTRY ENVIRONMENT

BACKGROUND OF INVENTION

1. Technical Field

This invention described herein relates generally to populating selection fields on a computer or a communications terminal. More particularly, the invention relates to entering at least one term from a context-sensitive list of selection terms without keyboard entry and searching based on the term.

2. Related Art

Since 1990, the telecommunications community has witnessed an explosive growth in the Internet. One of the features of the Internet which has assisted its growth is the number and completeness of Internet search engines. These engines scan most Internet sites for new information, and catalog this information into an easily searchable form through the engine's home page. Popular Internet search sites include, for example, Yahoo!™ (at http://www.yahoo.com), Lycos™ (at http://www.lycos.com), and Alta Vista™ (at http://www.altavista.com). These sites are accessible to the standard user through pointing the user's Internet Browser to the uniform resource locator (URL) (given above in parenthesis) of these sites. Examples of popular Internet Browsers include Netscape Communication Corporation's Navigator 3.0™ and Microsoft Corporation's Internet Explorer 3.0™.

When at a search site, a user enters information into a selection field. After submitting the entered information, the user receives a list of pages (or URLs) which pertain to the submitted information. Some search sites provide a general category listing (for example, "Computers") so a user can initially limit a search area to only that search area.

A drawback to the present functionality of the Internet is the requirement that the user have access to a keyboard. For example, Web TV™, while allowing a person's television to be used as an Internet exploration station requires the use of a bulky keyboard.

Minimal accommodation is made for users who do not have access to a keyboard. The minimal accommodation as currently implemented in web pages as well as in some Internet Browsers is through a fixed "pick list".

A pick list is a drop-down or pop-up menu listing of options available. In HTML version 3.0, a pick list option is represented by the following:

```
<p align="center">Selection:</p>
  <p align="center"><select name="name" size="1">
    <option>Term A </option>
    <option>Term B </option>
    <option>Term C </option>
    <option>Term D </option>
  </select></p>
```

The above listing of HTML code, when read into an Internet Browser, produces a pick list with a drop-down menu of terms A, B, C, and D. A drawback of pick lists as generated by a remote server (as containing the HTML code which forms a Web page) is that the terms selectable from the pick list are fixed. Accordingly, in situations where one desires to search a variety of terms, even if a pick list is provided by the web site, the pick list is fixed to what the programmer of the web site wants the user to see, not necessarily what the user wants to see.

Further, one difficulty experienced in searching on the Internet is the requirement that the searching user have a degree of familiarity with the terms (and spelling of the terms) before a site or document can be found.

Accordingly, a need exists to provide a keyboardless entry system for users who do not have ready access to a keyboard as well as a dynamic list of terms for easier searching.

SUMMARY OF THE INVENTION

The present invention overcomes the aforementioned problems as it provides user-specific content in a keyboardless environment. The present invention includes a pop-up, context sensitive menu of terms. By "pop-up" is meant a display menu in a screen or window of a screen. By "context sensitive" is meant the subject matter displayed to the user is selected on the basis of a topic in which a user is currently interested. These terms are selectable and enterable, for example, into selection fields on Internet search sites. Also, these terms are used to navigate through broadcast programming. Further, these terms are used to select on-demand services in an hybrid or coax network.

Embodiments of the present invention contemplate two distinct modules for creating and using the context sensitive pick lists.

The first module relates to the use of pick lists. Through user selection of a selection field, a pop-up menu appears listing a variety of selection terms. As contemplated by embodiments of the present invention, the displayed context sensitive terms relate to the previous selection terms used, the identity of the user (as a preferred selection list), and/or the terms present on the page currently displayed on a user's display device. After a user selects a term for population into a selection field, the first module outputs a variety of keyboard or software calls so as to make the web browsing software believe that it is receiving a typed version of the selected term.

The second module relates to the generation of the context sensitive pick list as including various associations between the terms contained in the pick list. Embodiments of the present invention contemplate at least three association processes which associate received terms for context sensitive retrieval. First, the received terms are associated with the selection terms used to find the current document. Second, the received terms are associated with the identity of a user who is using the web browser. Third, the received terms are associated with other terms present on the page currently displayed on a user's display device. Through the various ways of associating terms with other terms during the learning process, the embodiments of the present invention provide a user with an easy and intelligent field population scheme.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION

The present invention is discussed below with reference to Internet searching through an Internet browser as implemented in a user's residence. However, the present invention may be extended to other types of communications networks and systems. Alternative embodiments include, for example, populations of fields for on-line ordering. Also, the present invention will primarily be described with reference to residential applications for purposes of illustration, although it should be understood that its applicability is widespread including commercial and industrial applications.

The present invention relates to a system, method, and medium for entering selection information into a selection field. The invention relates to the use of a mouse, trackball, light pen, stylus, or other pointing device to select specific terms from an intelligent dictionary. The disclosure describes the environment supporting the invention, the creation of the intelligent dictionary with an application, and the use of the intelligent dictionary in an application.

Figure 1:
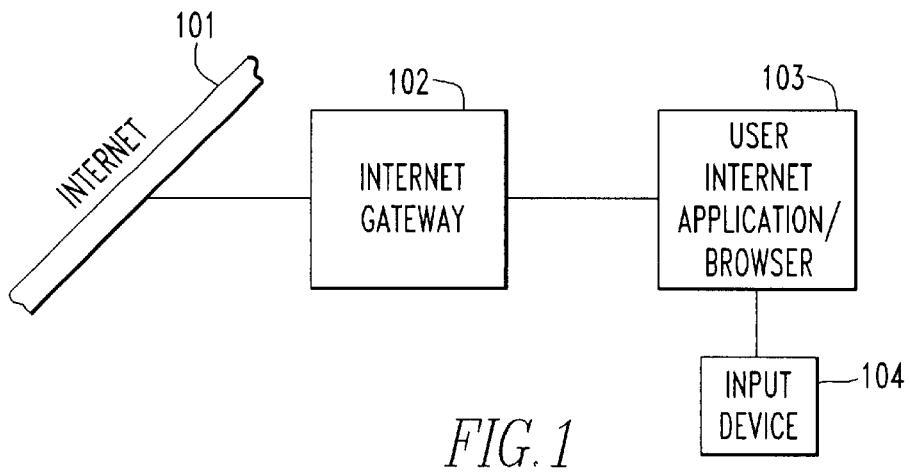
FIG. 1 shows a first hardware environment of the present invention.

FIG. 1 shows a connection of a system connected to the Internet 101, as including an embodiment of the invention. FIG. 1 shows Internet gateway 102 connecting a user 103 running an Internet application/browser to the Internet 101. The present invention contemplates Internet gateway 102 as at least one of a direct connection of a value added reseller (VAR). While a direct connection to the Internet allows large entities or experienced users direct access to Internet 101, a VAR provides an Internet connection in addition to providing a variety of other services. For example, America On Line™ (AOL), CompuServe™, and Prodigy™ are all VARs as each provides additional information and services to their users in addition to a direct connection to the Internet.

Input device 104 allows a user using the Internet Application/Browser at 103 to input information including, for example, terms upon which the user requests more information. Embodiments of the present invention contemplate input device 104 being a mouse or remote control. Without using a keyboard, the user inputs specific terms for retrieving or linking to additional information of interest through choosing the specific terms from an intelligent dictionary.

Embodiments of the present invention contemplate the Internet application/browser as being an application which operates in conjunction with the Internet. For instance, an example of an application includes Microsoft Word 97™ (from the Microsoft Corporation of Redmond, Washington) which allows embedded linking to destinations across the Internet. An example of a browser includes Netscape Navigator 3.0™ (from the Netscape Communications Corporation of California).

Figure 2:
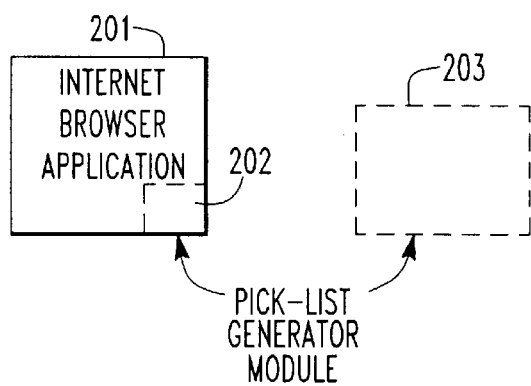
FIG. 2 shows an Internet Browser application supporting the various location of a pick-list generator module in accordance with embodiments of the present invention.

As shown in greater detail in FIG. 2, embodiments contemplate the intelligent agent 202 resident in either the application/browser or as a separate application 203, accessed by the application browser 201. For simplicity, the intelligent agent which provides selected terms associated with the user's searching desires is referred to as a "pick-list generator".

Figure 3:
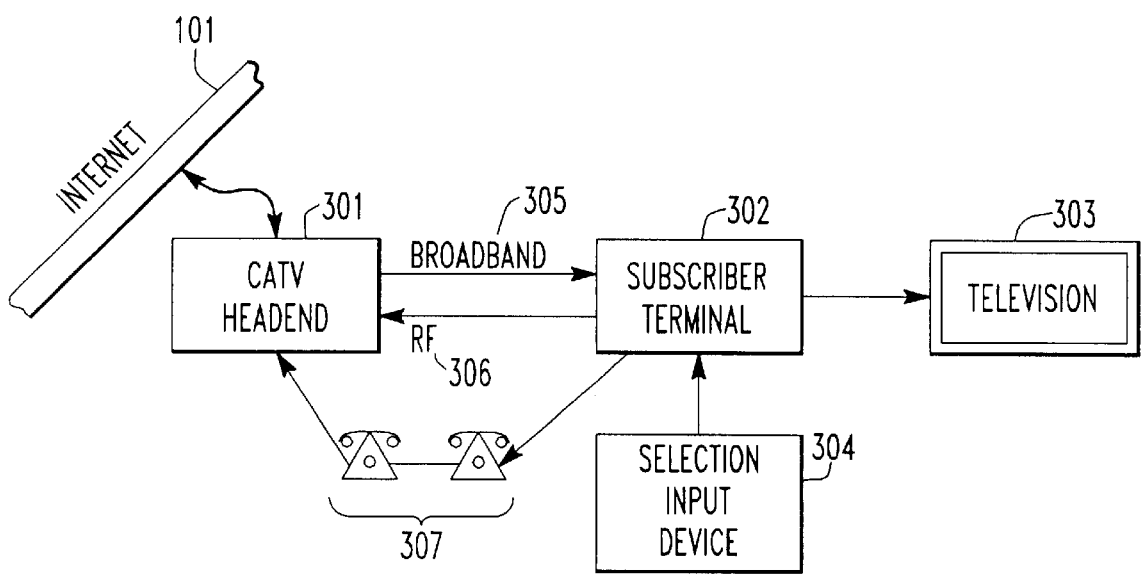
FIG. 3 shows a second hardware environment of the present invention.

FIG. 3 shows an alternate embodiment of the present invention as incorporated into a cable television system. FIG. 3 shows cable television head end 301 connected to Internet 101. Cable television head end 301 outputs a broad band signal 305 to a subscriber terminal 302. Common transmission means for broadband signal 305 include coaxial cable, fiber optic cable, and satellite signals. Subscriber terminal 302 outputs a selected channel to television 303 for watching by a user.

As contemplated by embodiments of the present invention, Internet access is provided to a user through the subscriber television system. In particular, a "Home Page" is transmitted to the user. The subscriber terminal interprets the received files and display them on the television 303. Through interaction with input device 304, a user may interact with the received home page and receive additional information from over the Internet. Information is uploaded through an RF interface 306 or through a telephone connection 307 to head end 301.

Input device 304 is a device which is controlled by a user to designate displayed information and/or input additional information into the subscriber terminal 302. In an Internet application of input device 304, embodiments contemplate the selection input device 304 as a mouse, a joystick, a remote control and equivalents thereof.

Figure 4:
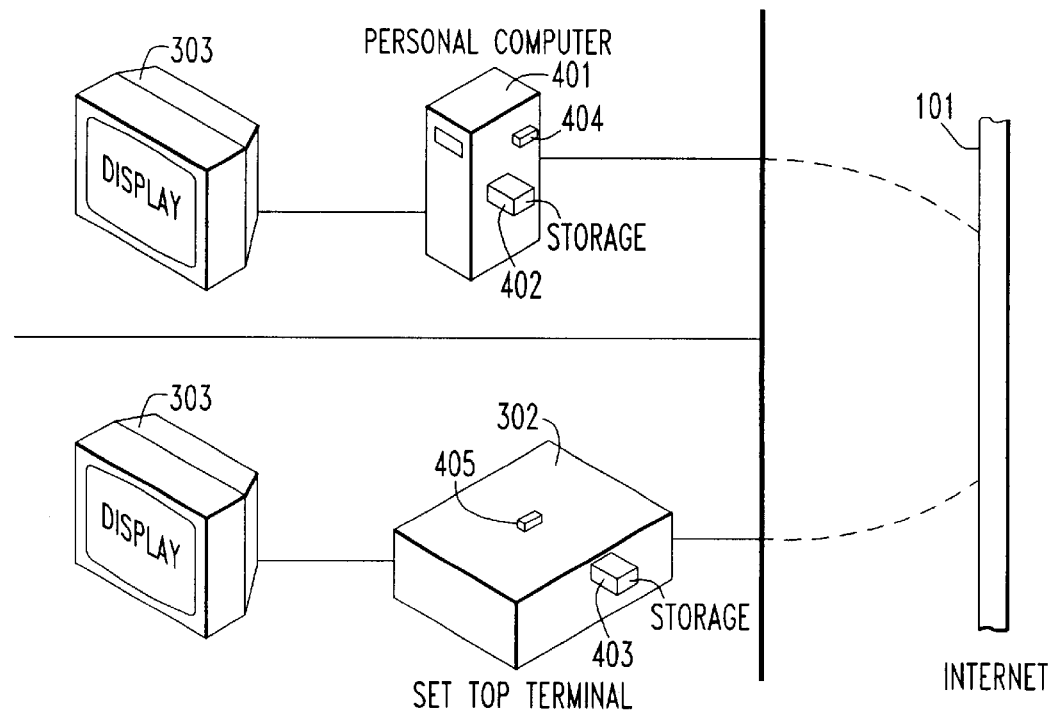
FIG. 4 shows selected portions of the first and second hardware environments in accordance with embodiments of the present invention.

FIG. 4 shows home applications of embodiments of the present invention. For example, personal computer 401 with, for example, a Pentium™ 166 processor 404 (manufactured by the Intel Corporation) with 16 MB of RAM a diskette drive, a CD ROM drive, a 1.6 GB hard drive (comprising storage 402), supports the Internet application/browser in conjunction with the pick list generator. In a cable television system, processor 405 found in set top 302 is related to processor 404 above. Also, storage 403 is related to storage 402. In a set top environment, embodiments of the present invention also contemplate the storage 403 as being a ROM, RAM, FLASH ROM or RAM, tape or disk and equivalents thereof.

Turning now to the pick list generator, it allows for the selection of terms useful to a user for searching and other Internet related functions. The list of terms produced by the pick list generator include text, numbers, URL's (uniform resource locators) (including HTTP, FTP, Gopher sites, etc.), and applications. The list of terms are grouped as needed and displayed to a user. In other words, the grouping of the terms are context sensitive. For example, as to the applications, the applications may be grouped by vendor (Microsoft, Corel, IBM, Apple), by the subject of the application (word processing, Internet browsing), by the title of the application (Word™, Internet Explorer™, Word Perfect™, Lotus Notes™), etc. As to other terms, for example, "cars", all related terms are associated together as well. Accordingly, by selecting a topic, the system displays to a user all topics associated with that topic.

Figure 5:
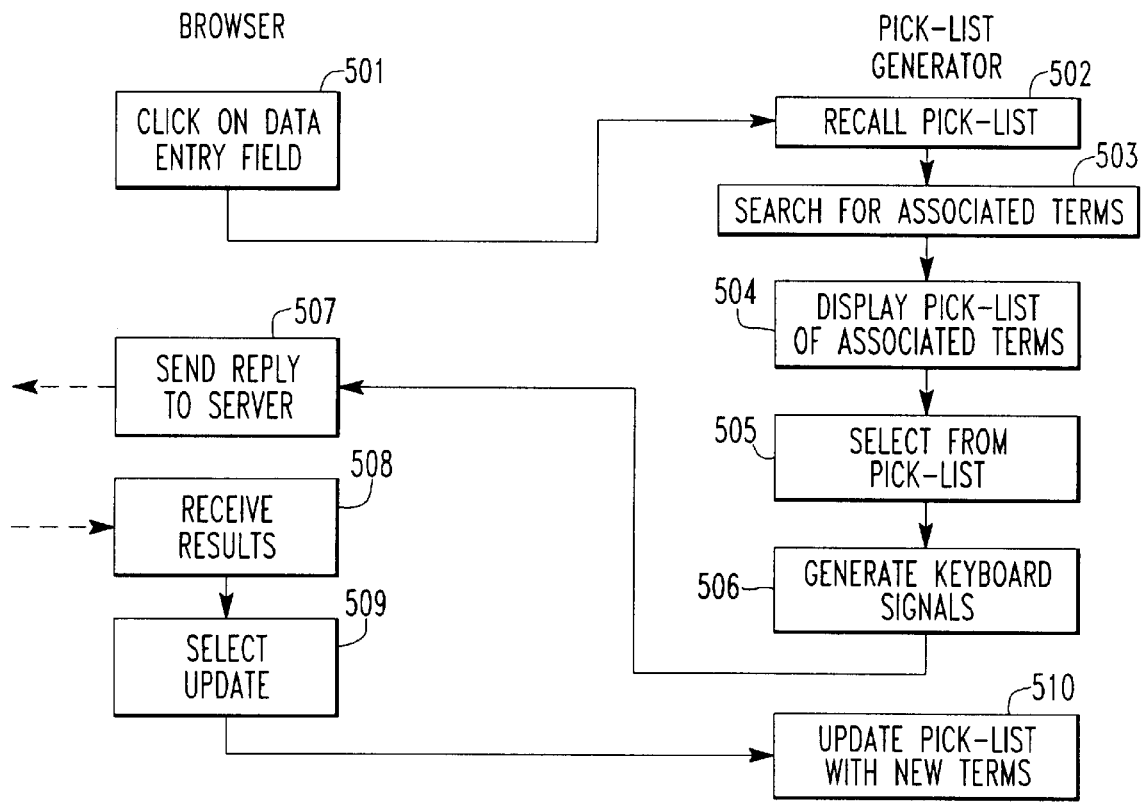
FIG. 5 shows a flowchart of the use of the selecting embodiments of the present invention.

FIG. 5 shows in greater detail the steps used to generate the pick list. Here, the pick list generator is described as external to the browser software. Also, the pick list generator can be incorporated into a browser or other application without undue experimentation using the described modules.

At step 501, the user indicates which data field the user wants populated with a term. Embodiments of the present invention contemplate a user clicking on a data field or pressing a selection button on a remote control. Next, step 502 initiates the pick list generator application and accesses the pick list as stored in memory. At step 503, the pick list generator searches for associated terms, either terms relating to previously selected search terms, terms associated with those terms on the page, and terms relating to a user's identity. Next, at step 504, the pick list generator displays the associated terms to the user. From the displayed list of terms, the user selects at least one term as noted is step 505. In step 506, the pick list generator takes the selected term and inputs it into the selected field (chosen in step 501). In one embodiment, the selected term (or terms) is input into the selected field through the generation of, for example, keyboard signals (keyboard calls) to convey the symbols comprising the selected term to the selected field. Alternative embodiments contemplate the generation of other signals including voice signals (for later voice recognition by a voice recognition system).

Next, in step 507, the term (or terms) entered into to the selected field are sent over the Internet to a server supporting the data selection field. Step 508 shows the reception of the results of the server's processing of the selected terms. For simplicity, the transmission to and from the server are shown by dotted lines. In a searching context, the received results are the results from the search on the server.

At this point, the user interacts with the displayed information. If the user desires, however, the pick list generator may be updated so as to learn from the search and/or the results of the search. The user updates the pick list generator through the operation of an update command in step 509. In an embodiment contemplated by the present invention, the selection of 509 is an update button present on the user's display. In response to step 509, the pick list generator updates the pick list with new terms as shown in step 510. Alternatively, embodiments of the present invention contemplate step 509 being automated so that the pick list is updated automatically, without the user's initiation.

Figure 6:
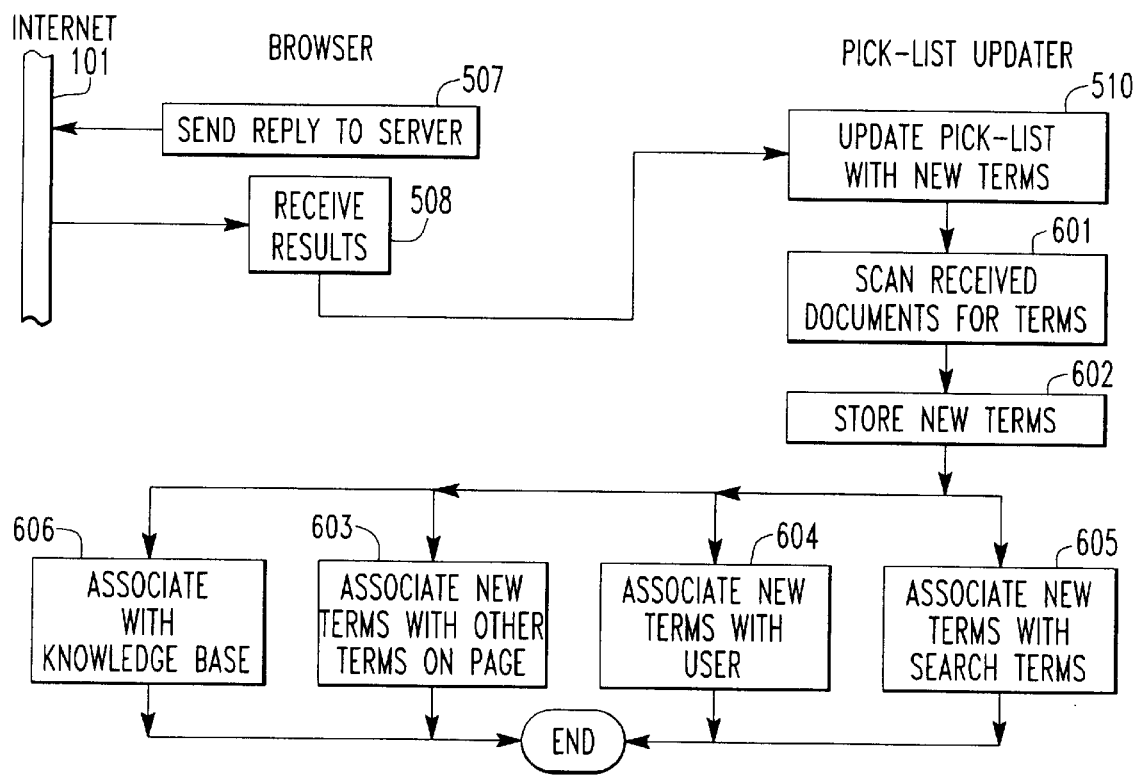
FIG. 6 shows a flowchart of the use of the generating and associating embodiments of the present invention.

FIG. 6 shows in greater detail the steps used in updating the pick list. For simplicity, the function performed by the pick list application with respect to updating the pick list with new information. Steps 507, 508, and 510 correspond to those of FIG. 5.

As used herein, the term "document" is intended to refer to an array of text, numbers, URLs, and equivalents thereof which comprise a set of useable information. In the case of receiving a document over the Internet, the document is intended to include home pages, files, content of e-mails, output from newsgroups, and, when scannable by a processor, image files.

Once a document is received, step 601 may be initiated (manually or automatically) to begin the updating process. In step 601, the received document is scanned for terms found therein. Embodiments of the present invention contemplate the scanning module scanning and recording each and every term, or alternatively, scanning and recording only certain types of terms (nouns, verbs, adjectives) while skipping articles (a, an, the) and conjunctions (and, but, or). Next, in step 602, the scanned and recorded terms are stored in memory. If a term is already stored in memory, then it does not need to be restored. Rather, the fact that the term already exists is noted and the system proceeds to at least one of the association steps 603, 604, 605, and 606. Also, alternative embodiments of the present invention contemplate the user being prompted after the scanning process as to whether the new terms should be entered into the user's dictionary of terms.

From this point, at least one of three association operations are contemplated. First, in step 603, the pick list update operation associates the new terms with other terms on the page or in previously stored, indexed knowledge bases. For example, if the user was viewing a page on "the Cars of 1997", which listed a variety of makes of cars (Audi, Buick BMW, etc.), then each of these new terms would be associated with each other or an automobile knowledge base. Additionally, embodiments of the present invention contemplate an adjustable distance limit between words to be associated. So, in a sentence of "cars of 1997" with the distance limit of three words, then the term "cars" would be associated with "1997" if scanned and terms found therein are associated with each other. But, in a sentence of "cars are including more standard features this year, and will include more in 1997", "cars" would not be associated with "1997", in this example, as more than three words separate "cars" and "1997".

In step 604, the newly uncovered terms are associated with the user. In this association step 604, the user has entered his or her identity into the computer for identification purposes. This would allow, for example, the use of prestored preference filters for screening of data according to a user profile. Embodiments of the present invention contemplate the filters being under a user's control. In this regard, a user profile is configured by the user for allowing or denying access to, for example, the user's display or knowledge base.

In step 605, the newly uncovered terms are associated with the selection terms used to retrieve the page. For example, if the user used the terms "Cars" and "1997" to find the uncovered page, then the terms found on the page (Audi, Buick, BMW, etc.) would be associated with each of the terms "cars" and "1997".

In step 606, the newly uncovered terms are associated with the selection terms by entering them into, for example, a relational knowledge base. An example includes DARPA's KQML and the KIF language (knowledge interchange format language), the KIF language providing the syntax for data storage. The knowledge base allows for cross lining between the terms so as to create a highly intricate interrelationship between terms. In this regard, the selection of a first term leads to other terms, which in turn lead to other terms.

Figure 7:
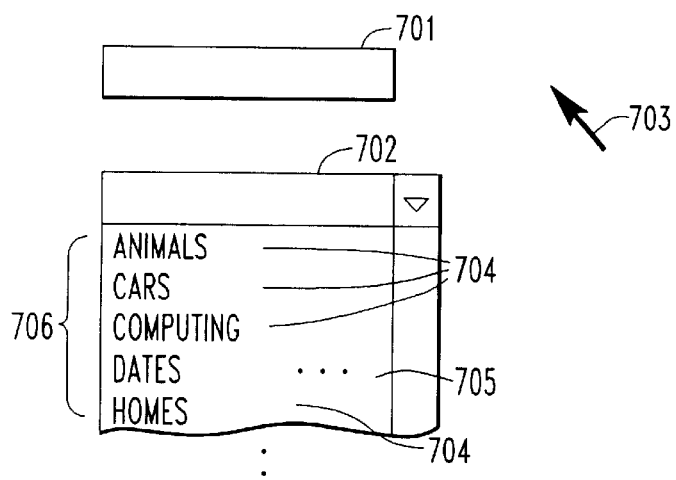
FIGS. 7–10 show various pick-list generation fields in accordance with embodiments of the present invention.

FIG. 7 shows a user interface to the pick list generator. Selection field 701 represents a selection field for a search engine. Pointer 703 represents the selection pointer as controlled by the user. The pick list generator has stored an initial dictionary of selected terms. Once selected, field 701 expands to field 702 as additionally displaying the contents of the pick list's initial dictionary and knowledge base 706. Here, the terms displayed include those -present in the initial dictionary of terms. For example, the terms include "animals", "cars", "computing", "dates", "home" etc.

Many representations of the terms exist. For example, the terms can be terms themselves as represented by terms 704 or can be links to greater list of terms 705. Here, the term "dates" is signified as also pointing to a list of terms relating to "dates" as indicated by being followed by periods of ellipsis. Selection of term 705 selects it for the population of field 701. As term 705 relates to additional terms, a user can access these additional terms through so selecting the term. Examples of the selection process include depressing an alternative mouse button (for example, the right mouse button) or remote button moves opens up another selection window as shown in greater detail in FIG. 8. Additional ways of access the terms to which a selected term links include timing how long a mouse pointer or selection control stays on a linked term. In this regard, staying at a certain location for more than a preset time limit is contemplated to also display the additional terms.

Figure 8:
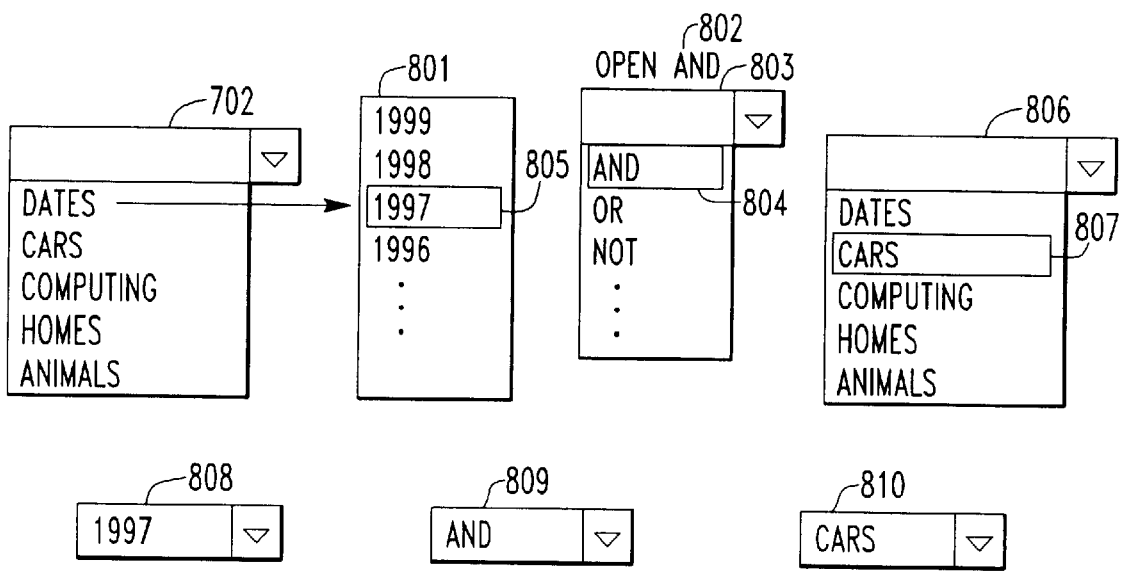

FIG. 8 shows the selection of multiple selection terms in accordance with embodiments of the present invention. Here, field 702 is shown as including a number of selection terms. Once a user selects a term as displayed in the list of terms, the term is entered as described in greater detail with respect to FIG. 5. Through operation of the selection device, multiple terms from the same list may be chosen. For example, from list 702, both "cars" and "computing" may be chosen. As to the link to an additional pick list, upon selection of "dates . . .", pick list 801 is displayed with more terms relating to the selected term. As more terms are associated with a single term, its representation is contemplated to change from a single representation to a representation followed by periods of ellipsis.

Referring again to FIG. 8, as shown by selection block 805, a user positions the selection block 805 over a chosen term or terms and performs an action which selects the term. The action includes clicking a mouse, pressing a key on a remote, etc. The term selected is then entered into selection field 808. It should be noted that selection field 808 is contemplated to be selection field 702 but without the list of terms attached. Alternatively, field 808 may be located in another portion of the displayed image.

A similar process is used to selection the operator 802 as designated in field 803. In this example, the conjunction "and" 804 has been selected. Next, it is entered into selection field 809 (which may or may not be the same as field 803).

Finally, a user may select a term as designated from field 806. In this case, the user selected "cars" as is highlighted by block 807. After selection, "cars" is entered into field 810. At this point a user submits the search (or order if on-line ordering if in an on-line ordering environment).

After a search result is received, commonly in the form of a document listing all references which included terms relating to the term or terms searched. At this point, as described in greater detail with regard to FIG. 6, the user may selectively (or automatically) load the contents of the found reference into the initial dictionary.

Figure 9:
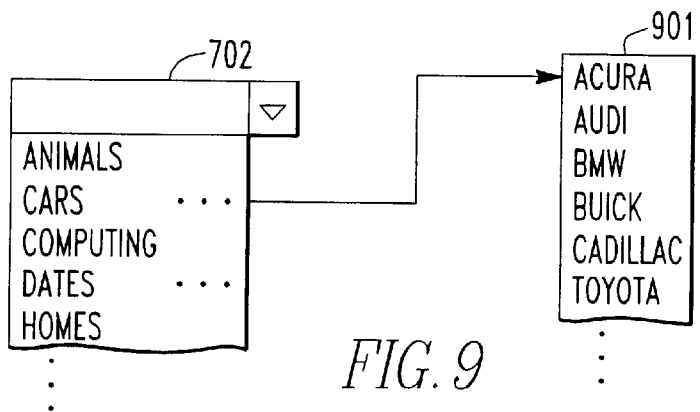
Figure 10:
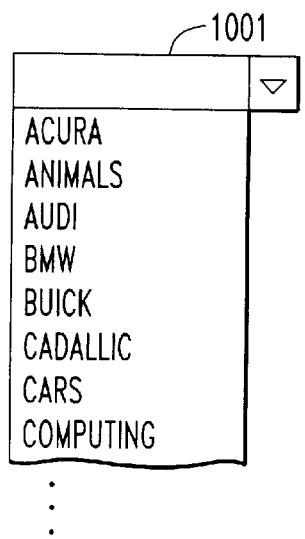

FIGS. 9 and 10 show an organizational scheme for indicating a modified dictionary. Referring to FIG. 9, selection field 702 includes terms "animals", "cars", "computing", "dates", and "homes". Terms "cars" and "dates" have periods of ellipsis after them signifying that they are associated with other terms. FIG. 9 shows that, in comparison with field 702 of FIG. 7, the initial dictionary which supplied the terms as found in FIG. 7 has been updated so as to include more terms.

Once a user designates, the term "cars", for example, the terms associated with "cars" appears as supplemental terms or pick list 901. In this example, the terms contained in pick list 901 include "Acura", "Audi", "BMW", "Buick", "Cadillac", and "Toyota". From the new pick list 901, a user may select any of these terms (and, by following associated terms along, select additional terms as well).

Embodiments of the present invention contemplate a variety of ways of terms becoming associated with each other. An example of how these terms became associated with the term "cars" includes searching for a document containing the term "cars", receiving a document from over the Internet relating to the term "cars", scanning the document for terms, storing the new term, and associating the found terms with the selection term "cars".

Another example of associating the found terms with the term "cars" includes associating the terms on a scanned page with each other. Accordingly, if a scanned document contained the sentence: "New cars for the model year include those manufactured by Acura, Audi, BMW, Buick, Cadillac, and Toyota", then an association function which associates found terms together, therefore, associates "new" with "cars" with "model" etc. Further, the present invention contemplates a simplistic grammar analysis function which associates terms by phrases. So, in this example, "new" would be associated with "cars", "model" would be associated with "year" etc.

FIG. 10 shows an alternate representation of how terms may be displayed. Here, the displayed terms in pick list 1001 include all terms including, for example, "Acura", "animals", "Audi", etc. This embodiment is useful when a user desires to view all terms it can search, for example, when starting a search anew.

An alternate embodiment as contemplated by the present invention includes the display of terms associated with those on a current document. For example, after a user receives a document, a processor scans the document for all terms. All terms found on the page as well as all terms associated with those found on the page are displayed in a pick list as represented by the pick lists of FIGS. 9 and 10.

Figure 11:
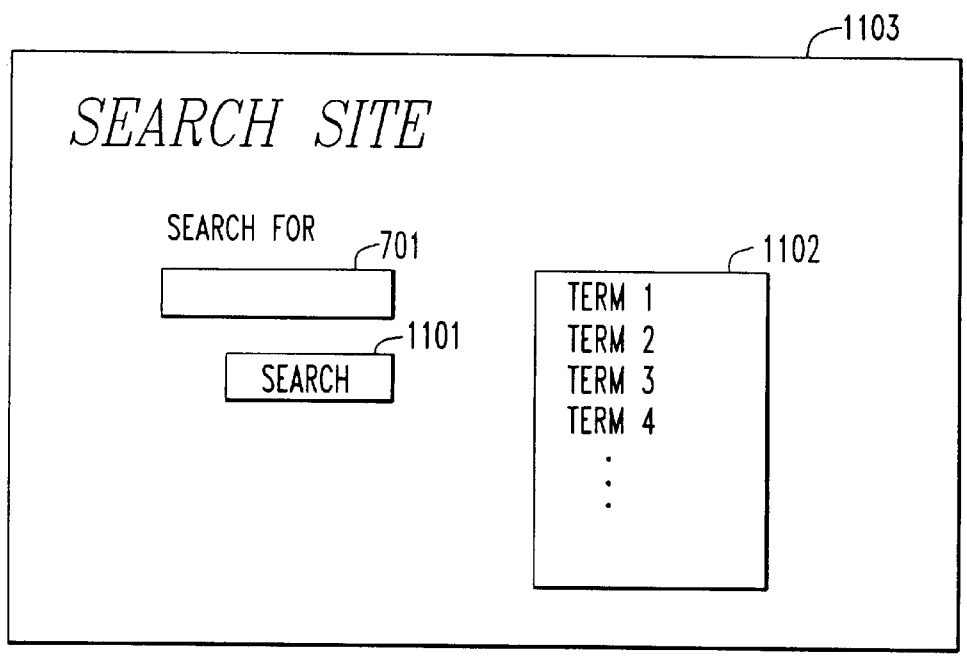
FIG. 11 shows a display of a search screen with a pick-list menu as contemplated by embodiments of the present invention; and, FIG. 12 shows a hand-held portable computer with a display containing a pick-list menu.

FIG. 11 show a display 1103 of a search site from where users perform searches. The display 1103 includes display field 701, submit search button 1101 and pick list pop-up field 1102 with terms "term 1", "term 2", "term 3", and "term 4". Once selection field 701 is selected, pick list 1102 is displayed. Selection of the terms of 1102 and their entry into field 701 is as described above.

Figure 12:
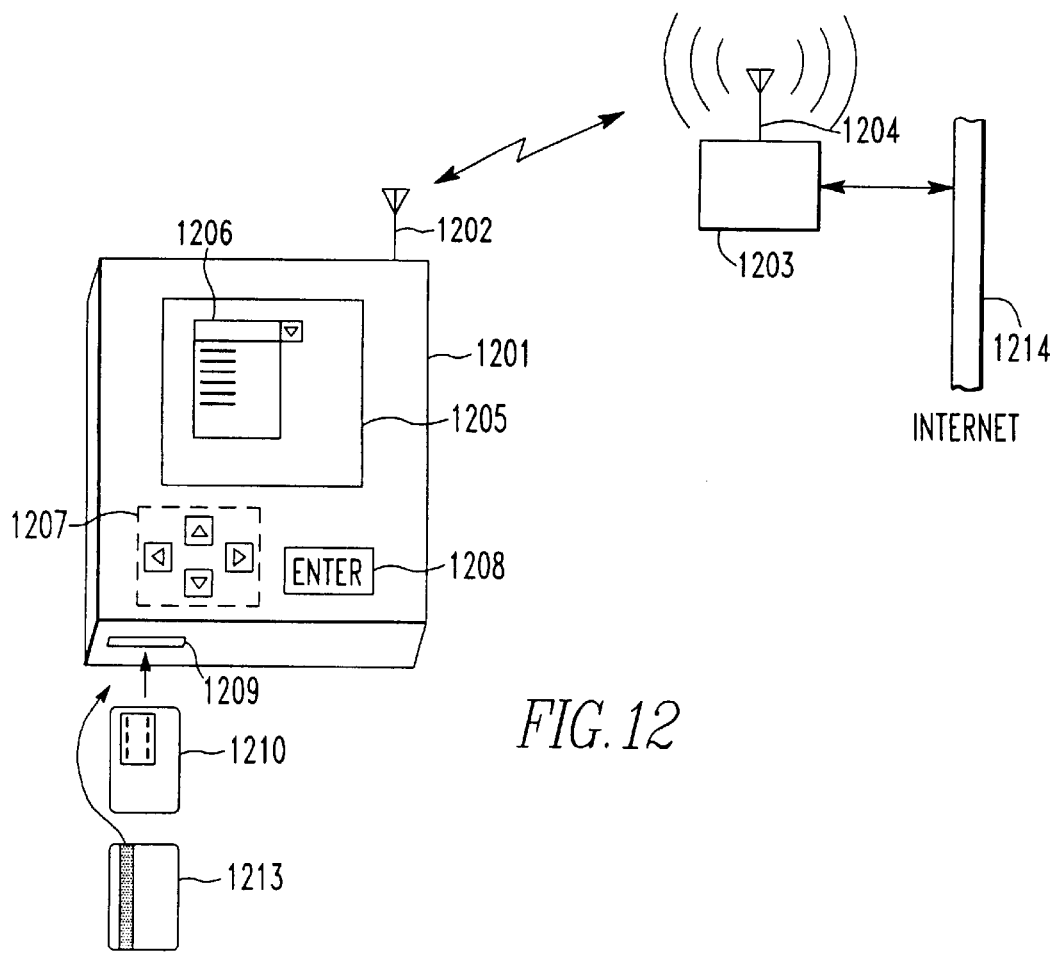

FIG. 12 shows a hand-held portable device as contemplated by the present invention. Hand-held device 1201 includes an antenna 1202 receiving information from transmitter 1203 with antenna 1204. Once information is selected on the hand-held portable device, the information or selected data relating to the information is transmitted back to transmitter 1203. The hand-held device 1201 includes a display 1205 displaying a selection field with a pick-list 1206 as described in greater detail above. Also included on device 1201 are selection keys 1207 and an enter key 1208 which are used in conjunction with the pick-list generator described with reference to FIGS. 5 et seq. Embodiments of the present invention contemplate the hand-held device 1201 including a 33 MHz Sparc II ASIC processor running at 40 MIPS.

Embodiments of the present invention further contemplate the use of replaceable storage modules to supplement the knowledge base or associated list of terms. The replaceable storage modules include a smart card 1210 and a card with a magnetic stripe 1213. The cards are read through an integrated card reader 1209. Applications for the portable device include on-line banking, travel itinerary monitoring, currency conversion, catalog sales, and secure transaction exchanges.

An example of a method of using the portable device is shown with respect to travel itinerary monitoring. A user is traveling and has made a number of hotel reservations. A user plugs in smart card 1210 (or card 1213) and initiates an inquiry as to the status of his reservations through operation of a selection menu or pick-list generator as described above. The portable device transmits a request to transmitter 1203 to retrieve updated itinerary information along with identification information so as to identify the user. Transmitter 1203 polls an updated database (for example, a database accessible through the Internet 1214) for updated information. The database returns updated itinerary information (for example, whether the hotels still have the user's reservations or whether a plane is arriving on time) to the transmitter 1203 which then transmits the information to the user's terminal 1201. Finally, the user's terminal displays on display 1205 the updated itinerary information.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A system for adding new terms to a list of terms comprising:

a receiving device for receiving a document;

a storage for storing a list of terms;

a processor for scanning said received document for at least one new term and processing the at least one new term contained within said received document, wherein said processor controls said storage to store said at least one new term with said list of terms and to store an association of the at least one new term with previously stored terms found in said list of terms;

a determination device for determining a users identity; and a profile retrieving device for retrieving a user's profile associated with the user's identity, wherein the association as formed by said processor is formed in accordance with the user's profile.

2. The system according to claim 1, wherein the association as formed by the processor associates the at least one term with other terms which exist on said received document.

3. The system according to claim 1, wherein the received document received by the receiving unit is selected in accordance with at least one selection term, and wherein the association as formed by the processor associates the at least one term with said at least one selection term.

4. The system according to claim 3, further comprising:

a selection device connected to said processor for selecting said selection term.

5. The system according to claim 1, wherein said processor filters said at least one term based on said user's profile to determine whether said at least one term should be associated with said list of terms.

6. The system according to claim 1, further comprising:

a knowledge base, wherein the association with the at least one term is formed with other terms of said list of terms within said knowledge base.

7. A computer readable medium containing a computer implemented program comprising:

a scanning module for scanning a received document for the existence of a new term;

an adding module for adding the new term to a stored list of terms;

an associating module for associating the new term with previously stored terms found in said list of terms;

a determining module for determining a user's identity;

a profile retrieving module for retrieving a user's profile associated with the user's identity; and wherein the associating module associates the new term in accordance with the user's profile.

8. The computer readable medium according to claim 7, wherein said associating module associates the new term with other terms which exist on said received document.

9. The computer readable medium according to claim 7, wherein said associating module associates the new term with at least one selection term taken from the stored list of terms, said at least one search term having been used to retrieve said received document.

10. The computer readable medium according to claim 9, further comprising:

a selecting module for selecting said selection term via operation of a selection device.

11. The computer readable medium according to claim 7, further comprising:

a searching module for initiating a search of a network of computers, wherein the result of said search is said received document and wherein said network of computers is the Internet.

12. The computer readable medium according to claim 11, wherein said searching module is an Internet browser.

13. The computer readable medium according to claim 11, wherein said searching module is an application which can access the Internet.

14. The computer readable medium according to claim 7, wherein said associating module filters the new term based on the user's profile to determine whether said at least one term should be associated with said list of terms.

15. The computer readable medium according to claim 7, further comprising:

a knowledge base module organizing said stored list of terms, wherein the associating module associates the new term with previously stored terms of said list of terms within said stored list of terms.

16. A method of populating, by a client based program module, a selection field in a document with at least one term selected from a list of terms context-sensitive to the selection field, the method comprising the steps of:

displaying the document including the selection field;

receiving a first user input selecting the selection field to be populated;

retrieving, by the client based program module, an initial terms list;

searching, by the client based program module, the document for terms associated with the selection field;

creating an associated terms list from the initial terms list and based on at least one term associated with the selection field, the at least one term a resultant of the search of the document;

displaying at least a portion of the associated terms list, the displayed portion of the associated terms list comprising terms context-sensitive to the selected selection field;

receiving a second user input selecting a term from the displayed context-sensitive terms; and populating, by the client based program module, the selection field with the selected term from the list of terms context-sensitive to the selection field.

17. The method of claim 16, wherein the step of populating the selection field further comprises the step of:

generating a call corresponding to the selected term of the populated selection field.

18. The method of claim 16, further comprising the step of creating and storing, in a client based memory, a new initial list including the at least one term associated with the selection field.

19. The method of claim 16, further comprising the steps of:
   identifying a user selecting the selection field; and
   adding to the associated terms list previously input terms and terms associated with the identified user.

20. A method of adding a new term to an initial list of terms used by a client based program module to generate a context-sensitive pick-list for a data-entry field in a document, the method comprising the steps of:
   searching, by the client based program module, the document for existence of the new term, the new term not being previously included in the initial list of terms; and
   adding the new term to the initial list of terms, whereby the context-sensitive pick-list is generated for the data-entry field in the document by the client based program module from the initial list of terms with the new term added, wherein the adding step includes utilizing a term-type filter to selectively determine types of terms to be added based on term types selected from a group consisting of nouns, verbs, adjectives, articles, and conjunctions.

21. The method of claim 20, further comprising the step of creating and storing, in a client based memory, a new initial list including the new term.

22. The method of claim 20, further comprising, prior to the step of adding the new term to the initial list of terms, the steps of:
   highlighting the new term in the document;
   receiving user input indicating that the new term should be added; and
   adding the new term to the initial list of terms only if the user input indicates that the new term should be added.

23. A method of creating and updating a client-based database of associated terms used for generating a context-sensitive pick-list for a data-entry field, the method comprising the steps of:
   retrieving an initial terms list;
   creating the client-based database of associated terms from the initial terms list;
   searching a document associated with the data-entry field for a new term not currently included in the database;
   creating a plurality of term association types for associating each term in the database with other related terms in the database;
   associating the new term with at least one other related term in the database based on at least one of the term association types; and
   updating the database to include the new term and the association of the new term to at least one other related term,
      whereby the database and the associations based on the plurality of term association types are used to generate the context-sensitive pick-list.

24. The method of claim 23, further comprising the step of creating at least one term association type for associating terms in the database with at least one other term added from the document.

25. The method of claim 23, further comprising the step of creating at least one term association type for associating terms in the database with a user identity, the term association type based on the user identity when each term was added to the database.

26. The method of claim 23, further comprising the step of creating at least one term association type for associating terms in the database with terms in the database previously selected by a user input.

27. The method of claim 23, wherein the step of searching the document further includes a term-type filter and the term-type filter selectively determines terms to be designated as new terms based on at least one tern-type selected from a group consisting of nouns, verbs, adjectives, articles, and conjunctions.

28. The method of claim 27, wherein the step of searching the document further includes a distance-limit filter, wherein the distance-limit filter selectively determines at least one term association type of the new term based on a user determined number of terms between the designated new term and at least one other term added to the database from the document.

29. A system for generating a pick-list for a data-entry field in a document when no pick-list is initially provided for the data-entry field, the system comprising:
   a client-based storage device for storing a list of terms and relative associations of the terms in the list; and
   a processor for determining that no pick-list is available for the data-entry field and, if no pick-list is available, for searching for and processing at least one term contained within the document, for creating a relative association of the at least one term from the document to the data-entry field and to at least one term in the list of terms, for generating the pick-list for the data-entry field from the list of terms based on the relative associations of the list of terms to the at least one term from the document, for determining a user's identity, and for retrieving a user's profile associated with the user's identity, wherein the relative association is formed in accordance with the user's profile.

30. The system of claim 29, wherein the processor controls the storage device to store the at least one term from the document and the relative associations of the at least one term from the document if the at least one term from the document is not currently in the list of terms.

31. A system for adding additional terms to an existing pick-list, the system comprising:
   a client-based storage device for storing a list of terms and relative associations of the terms in the list; and
   a processor for determining the current terms of the existing pick-list, for searching for and processing at least one term contained within a document associated with the pick-list, for generating additional terms for the pick-list based on the relative associations of the terms in the list of terms to the at least one term from the document, for determining the additional terms not currently in the existing pick-list, for adding those additional terms not currently in the existing pick-list to create a new pick-list, for determining a user's identity, and for retrieving a user's profile associated with the user's identity, wherein the relative association is formed in accordance with the users profile.

32. The system of claim 31, wherein the processor controls the storage device to store the at least one term from the document and the relative associations of the at least one term from the document if the at least one term from the document is not currently in the list of terms.

* * * * *

UNITED STATES PATENT AND TRADEMARK OFFICE
CERTIFICATE OF CORRECTION

PATENT NO. : 6,374,275 B2
DATED : April 16, 2002
INVENTOR(S) : Wasilewski

It is certified that error appears in the above-identified patent and that said Letters Patent is hereby corrected as shown below:

Column 2,
Line 32, delete "device," and insert therefore -- device. --

Column 4,
Line 35, insert a comma after "RAM"

Column 6,
Line 6, insert a comma after "Buick"
Line 41, delete "lining" and insert therefore -- linking --
Line 55, delete "home" and insert therefore -- homes --

Column 9,
Line 28, delete "users" and insert therefore -- user's --

Column 12,
Line 10, delete "tern-type" and insert therefore -- term-type --
Line 60, delete "users" and insert therefore -- user's --

Signed and Sealed this

Twenty-fifth Day of June, 2002

*Attest:*

*Attesting Officer*

JAMES E. ROGAN
*Director of the United States Patent and Trademark Office*